(12) United States Patent
Bedekar

(10) Patent No.: US 10,887,072 B2
(45) Date of Patent: Jan. 5, 2021

(54) METHODS AND APPARATUS FOR ADJUSTING A CARRIER AGGREGATION OPERATION IN A WIRELESS COMMUNICATION SYSTEM

(71) Applicant: Nokia Solutions and Networks OY, Espoo (FI)

(72) Inventor: Anand Bedekar, Glenview, IL (US)

(73) Assignee: Nokia Solutions and Network Oy, Espoo (FI)

( * ) Notice: Subject to any disclaimer, the term of this patent is extended or adjusted under 35 U.S.C. 154(b) by 22 days.

(21) Appl. No.: 15/914,785

(22) Filed: Mar. 7, 2018

(65) Prior Publication Data

US 2019/0280845 A1 Sep. 12, 2019

(51) Int. Cl.
*H04L 5/00* (2006.01)
*H04W 24/10* (2009.01)
*H04W 72/04* (2009.01)
*H04W 28/16* (2009.01)

(52) U.S. Cl.
CPC ............ *H04L 5/0098* (2013.01); *H04L 5/001* (2013.01); *H04L 5/0075* (2013.01); *H04W 24/10* (2013.01); *H04W 28/16* (2013.01); *H04W 72/0433* (2013.01); *H04L 5/0091* (2013.01)

(58) Field of Classification Search
None
See application file for complete search history.

(56) References Cited

U.S. PATENT DOCUMENTS

| | | |
|---|---|---|
| 9,088,912 B2 | 7/2015 | Ou |
| 9,655,117 B2 | 5/2017 | Yao et al. |
| 9,756,532 B2 | 9/2017 | Lu et al. |
| 2015/0071192 A1 | 3/2015 | Moilanen et al. |
| 2016/0262118 A1* | 9/2016 | Kim ..................... H04W 52/365 |
| 2016/0302203 A1* | 10/2016 | Liu ........................ H04L 5/001 |
| 2017/0034840 A1* | 2/2017 | Mandil ................ H04W 24/10 |
| 2017/0105162 A1* | 4/2017 | Kim ..................... H04W 36/026 |
| 2017/0127325 A1* | 5/2017 | Vikberg ................ H04L 5/0035 |
| 2017/0201902 A1* | 7/2017 | Chen ................. H04W 28/0215 |
| 2018/0270791 A1* | 9/2018 | Park ....................... H04W 68/04 |

(Continued)

FOREIGN PATENT DOCUMENTS

| | | |
|---|---|---|
| WO | WO-2015/089791 A1 | 6/2015 |
| WO | WO-2017/091115 A1 | 6/2017 |
| WO | WO-2017/148399 A1 | 9/2017 |

OTHER PUBLICATIONS

International Search Report and Written Opinion for corresponding PCT application No. PCT/EP2019/053848 dated May 10, 2019.

(Continued)

*Primary Examiner* — Donald L Mills
(74) *Attorney, Agent, or Firm* — Harness, Dickey & Pierce, P.L.C.

(57) ABSTRACT

In one embodiment, an apparatus includes a memory storing computer readable instructions; and at least one processor configured to execute the computer readable instructions, which configure the processor to receive data/attributes from a radio access network, RAN, related to a carrier aggregation operation performed by the RAN; determine at least one adjustment to the carrier aggregation operation based on the received data/attributes; and send the at least one adjustment to the RAN.

20 Claims, 7 Drawing Sheets

(56) References Cited

U.S. PATENT DOCUMENTS

2019/0053120 A1* 2/2019 Park .................... H04W 36/305
2019/0053319 A1* 2/2019 Jeon ..................... H04L 5/0044
2019/0116585 A1* 4/2019 Chakraborty ......... H04W 76/15

OTHER PUBLICATIONS

Omer Narmanlioglu et al., "New Era in Shared C-RAN and Core Network: Case Study for Efficient RRH Usage," 2017 IEEE International Conference on Communications (ICC), IEEE, May 21, 2017, pp. 1-7, XP033133286.
"QoS aware downlink scheduler for a carrier aggregation LTE-Advance network with efficient carrier power control" IEEE Xplore Digital Library.

* cited by examiner

METHODS AND APPARATUS FOR ADJUSTING A CARRIER AGGREGATION OPERATION IN A WIRELESS COMMUNICATION SYSTEM

BACKGROUND

A communication system can be seen as a facility that enables communication sessions between two or more entities such as user terminals, base stations and/or other nodes by providing carriers between the various entities involved in the communications path. A communication system can be provided for example by a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite-based communication systems and different wireless local networks, for example wireless local area networks (WLAN). The wireless systems can typically be divided into cells and are therefore often referred to as cellular systems whether digital or analog.

A user can access the communication system by an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP). Since introduction of fourth generation (4G) services increasing interest has been paid to the next, or fifth generation (5G) standard. 5G may also be referred to as a New Radio (NR) network. Standardization of 5G or New Radio networks is an on-going study item. Some network operators have encouraged opening up control of the radio access network (RAN), in particular of the radio resource management (RRM) functions. The xRAN consortium (http://www.xran.org/) has been formed to promote open application programming interfaces (APIs) into the RAN.

SUMMARY

One or more example embodiments relate to an apparatus for adjusting a carrier aggregation operation in a wireless communication system.

In one embodiment, the apparatus includes a memory storing computer readable instructions; and at least one processor configured to execute the computer readable instructions, which configure the processor to receive data/attributes from a radio access network, RAN, related to a carrier aggregation operation performed by the RAN; determine at least one adjustment to the carrier aggregation operation based on the received data/attributes; and send the at least one adjustment to the RAN.

In another embodiment, the apparatus includes a memory storing computer readable instructions; and at least one processor configured to execute the computer readable instructions, which configure the processor to receive at least one adjustment from a control apparatus; and perform a carrier aggregation operation based on data/attributes and the received adjustment.

At least one embodiment relates to a method for adjusting a carrier aggregation operation in a wireless communication system.

In one embodiment, the method includes receiving, at an apparatus, data/attributes from a radio access network, RAN, related to a carrier aggregation operation performed by the RAN; determining at least one adjustment to the carrier aggregation operation based on the received data/attributes; and sending the at least one adjustment to the RAN.

In another embodiment, the method includes receiving, at a radio access network apparatus, at least one adjustment from a control apparatus; and performing a carrier aggregation operation based on data/attributes and the received adjustment.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

Accordingly, it should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Before explaining in detail the examples, certain general principles of a wireless communication system and mobile communication devices are briefly explained with reference to FIGS. 1 to 4 to assist in understanding the technology underlying the described examples.

Figure 1:
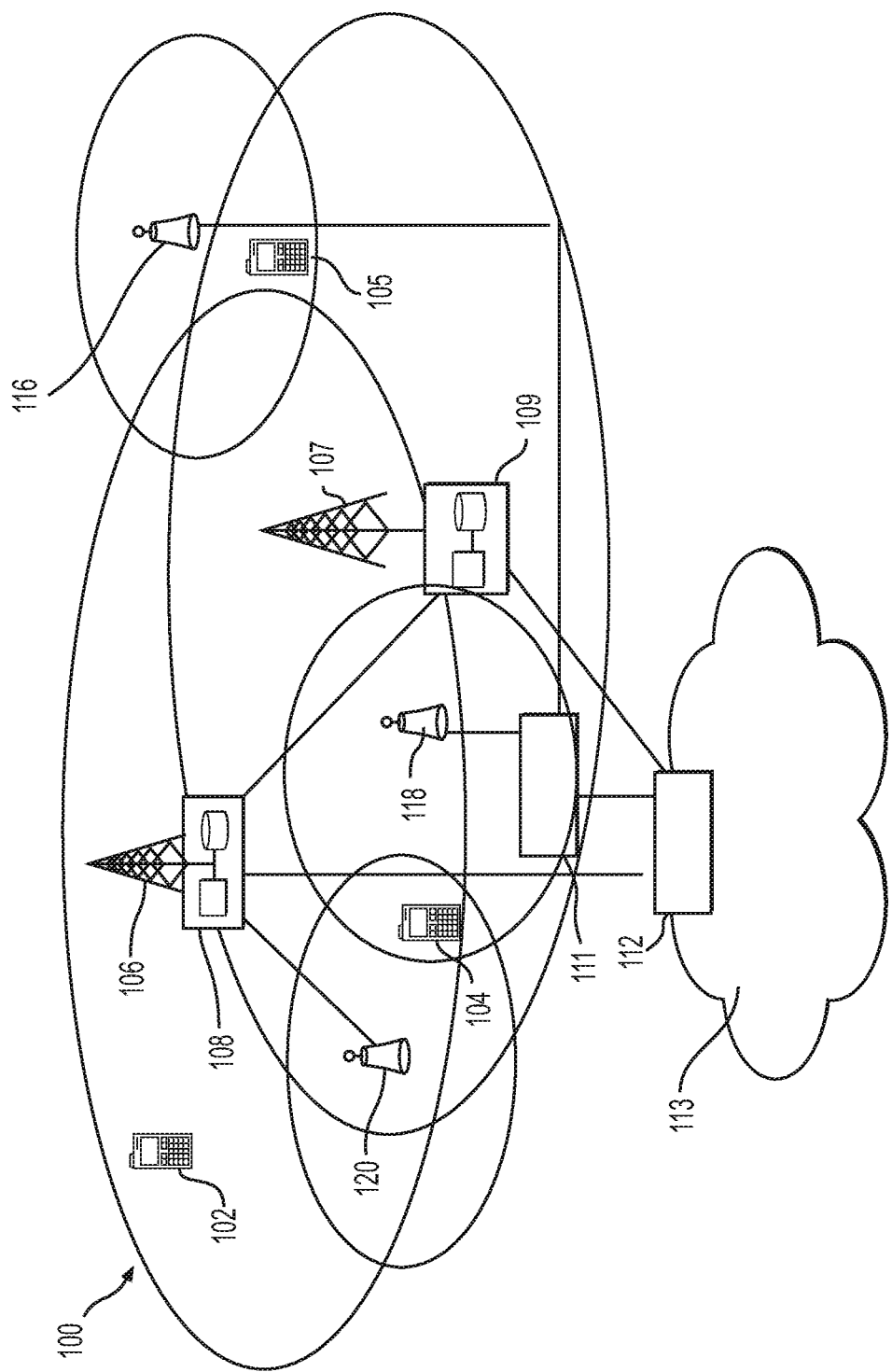
FIG. 1 shows a schematic diagram of an example communication system.

In a wireless communication system 100, such as that shown in FIG. 1, mobile communication devices or user equipment (UE) 102, 104, 105 are provided wireless access via a radio access network RAN. The RAN includes at least one base station (e.g., cell site and/or hub) or similar wireless transmitting and/or receiving node or point as well as control entities such as servers at a central office (CO) and/or edge data center.

In FIG. 1, base stations 106 and 107 are shown as connected to a wider communications network 113 via gateway 112. A further gateway function may be provided to connect to another network. The base stations 106 and 107 are supported by control entities 108 and 109. The operations of the RAN may be distributed amongst the base stations 106 and 107 and the control entities 108 and 109. The control entities 108 and 109 and/or base stations 106 and 107 are provided with memory capacity and at least one data processor.

A control apparatus may control or influence aspects of the RAN operation. The control apparatus may be located in the RAN or in a core network (CN) (not shown) and may be implemented as one central apparatus or its functionality may be distributed over several apparatuses. The control apparatus may be part of a base station, a control entity and/or provided by a separate entity such as a radio network controller. In FIG. 1, for example, the control entities 108 and 109 may implement the control apparatus. In some systems, the control apparatus may additionally or alternatively be provided in a radio network controller.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the control apparatus 108. In some embodiments, the smaller stations may not be provided. Smaller base stations 116, 118 and 120 may be part of a second network, for example WLAN and may be WLAN APs.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area.

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer QoS support, and some on-demand requirements for e.g., QoS levels to support QoE of user point of view. Also network aware services and applications, and service and application aware networks may bring changes to the architecture—those are related to Information Centric Network (ICN) and User-Centric Content Delivery Network (UC-CDN) approaches. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Figure 2:
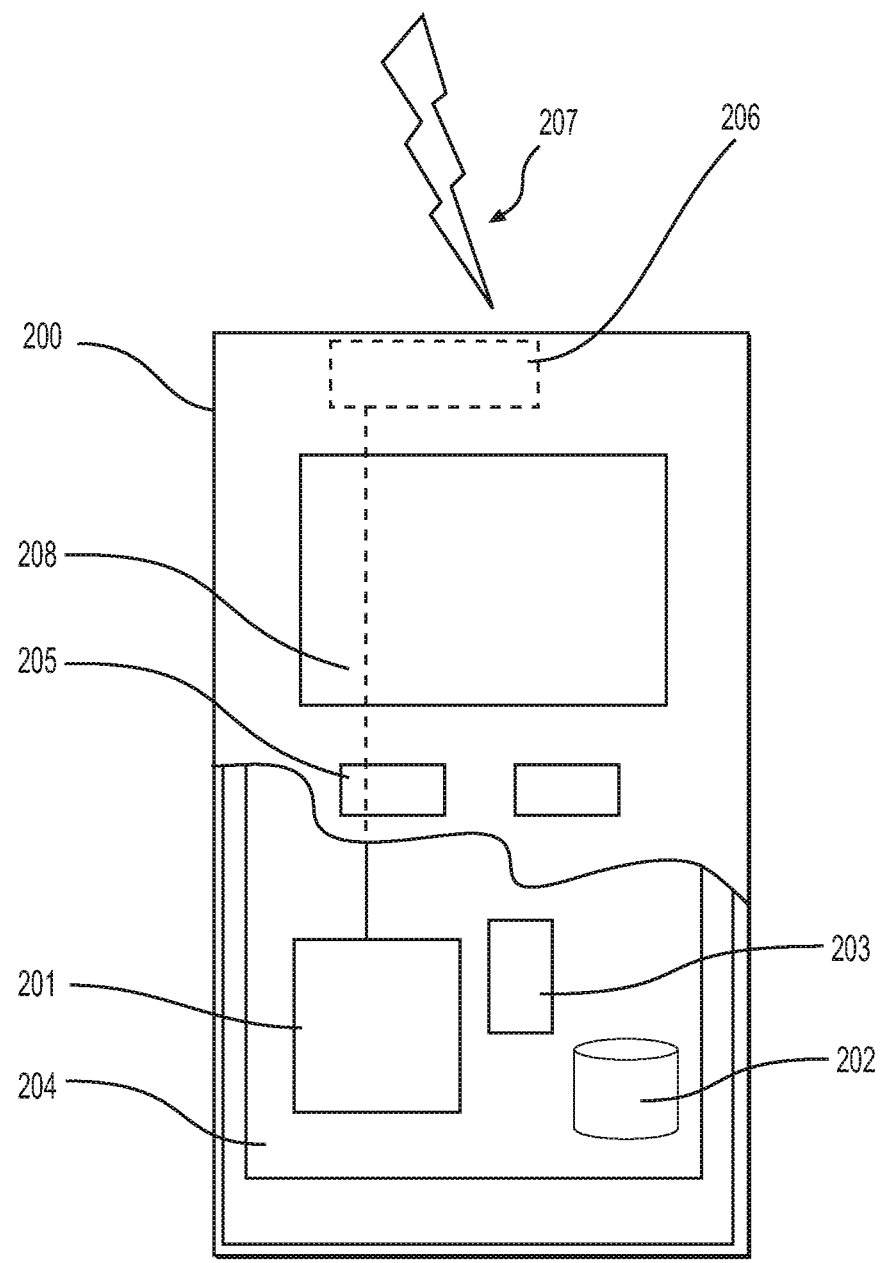
FIG. 2 shows a schematic diagram of an example mobile communication device.

A possible implementation of mobile communication device such as UEs 102, 104 and 105 will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by a radio part and associated antenna arrangement. The antenna arrangement may be arranged internally or externally to the mobile device.

Figure 3:
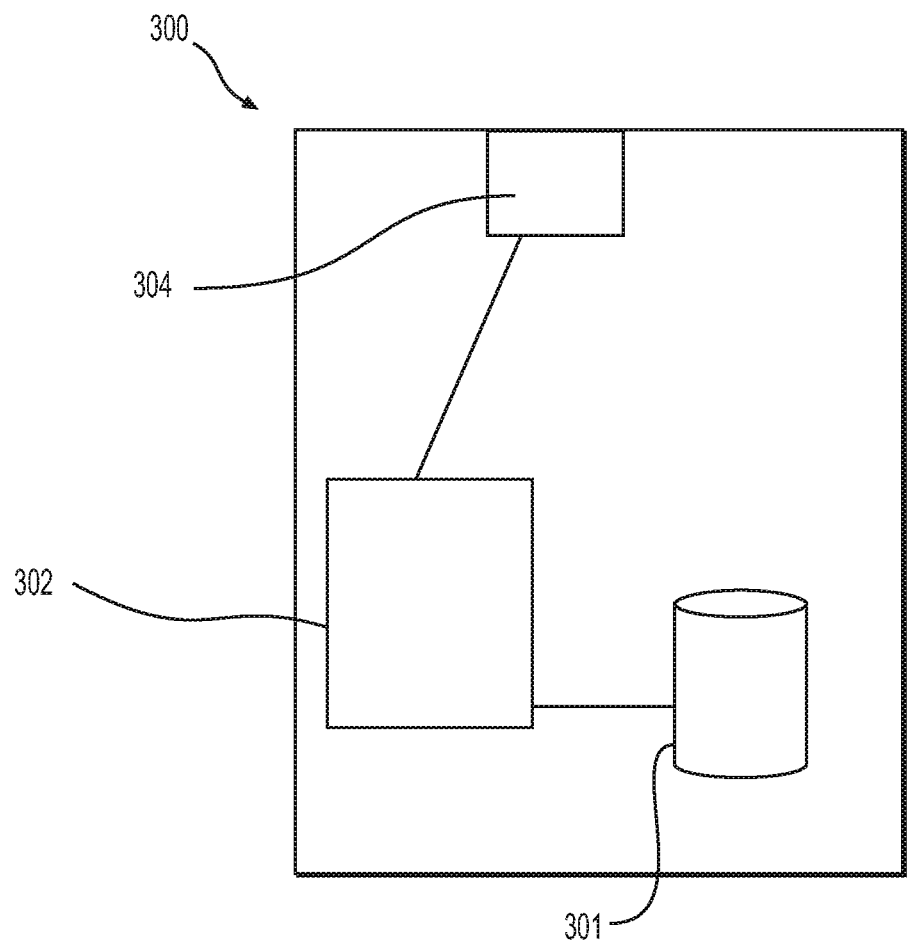
FIG. 3 shows a schematic diagram of an example control entity.

FIG. 3 shows an example of a control entities such as base stations 106, 107, control entities 108 and 109, etc. for a communication system. The control entity 300 may perform any well-known RAN functionality. Additionally or alternatively, the control entity may provide the control apparatus that controls and/or influences operation of the RAN, such as a RAN node (e.g., a base station, eNB or gNB) or a node of a core network such as an MME or S-GW, or a server or host. The methods for controlling or influencing RAN operation may be implanted in a single control apparatus or across more than one control apparatus. As previously discussed, the control apparatus may be integrated with or external to a node or module of a core network or RAN. In some embodiments, base stations comprise a separate controller or module. In other embodiments, the control apparatus can be another network element such as a radio network controller or a spectrum controller. In some embodiments, each base station may have such a control apparatus as well as a control apparatus being provided in a radio network controller. The control entity 300 comprises at least one memory 301, at least one data processing entity 302, and an input/output interface 304. The interface 304 represents a collection of interfaces for the control entity 300. For example, via the interface the control entity may interface with other network elements and/or, for example, the control entity can be coupled to a receiver and a transmitter of the base station. The receiver and/or the transmitter may be implemented as a radio front end or a remote radio head.

Figure 4:
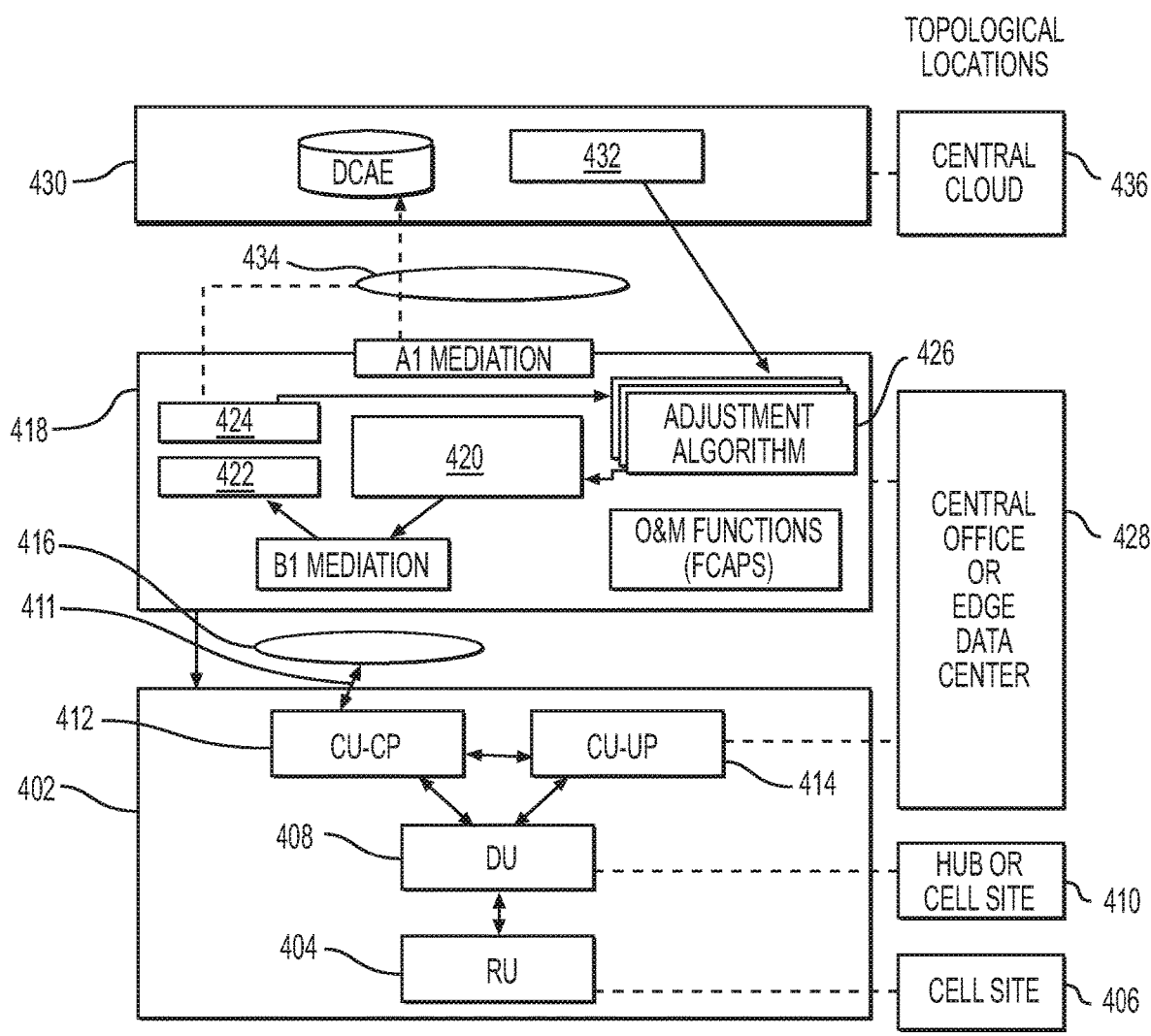
FIG. 4 shows a schematic diagram of an example functional and topographical system architecture.

FIG. 4 shows a functional and topological system architecture including a control apparatus according an example embodiment. The system comprises a RAN Node 402 which may be a gNB or another RAN node such as eNB, etc. It will be understood that the system may include many RAN nodes, but for clarity and brevity, only a single RAN node 402 (also simply referred to as RAN 402) is shown. The RAN node 402 may comprise various interfaces or functional units: RU (radio unit) 404 which may be hosted at a cell site 406; DU (distributed unit) 408 which may be hosted at a CRAN (cloud RAN) hub or cell site 410; CU-CP (central unit-control plane) 412; and CU-UP (central unit-user plane) 414. The CU-CP and CU-UP may be hosted at a Central Office (CO) or edge data center 428. The units are in communication with each other as schematically shown by the arrows in FIG. 4.

The RAN node 402 is in communication with, and may be controlled or influenced by, controller 418 representing the functionality of the control apparatus. The controller 418 may be known as an Optimizer or Optimization Engine or the like. The RAN node 402 may comprise an interface (e.g., an Application Programming Interface) 411 towards the controller 418. Communication between RAN node 402 and controller 418 may be via a reference point 416 which may be labelled B1. The controller 418 may comprise the following functional units shown schematically: control API 420, which may send control information to RAN node 402 (e.g. to CU-CP 412); data gathering/processing unit 422, which may gather data from the RAN node 402 (e.g. may receive information from CU-CP 412) and provide stream processing or in-memory database facilities; analytics or Machine Learning (ML) toolkits 424; services performing RAN operations, influencing or optimization (e.g., carrier aggregation adjustment) algorithms 426. The controller 418 may be realized using a real-time database for data gathering, analytics and RAN influence and optimization as microservices. In this example the controller 418 may be hosted at a Central Office (CO) or edge data center 428. It will be understood that the central office or edge data centers include one or more control entities such as control entity 300.

A policy node is schematically shown at 430. This may be an Orchestration/Policy Engine, such as an Open Network Automation Platform (ONAP) or a network management system (NMS) or an operations support system (OSS) or a Policy Control Function (PCF or PCRF etc.). The policy node 430 may comprise a policy database or processing engine 432 and an analytics system, which may provide the policy node capabilities of storing and processing historical data and applying centralized policy, for example with a data collection and analytics engine (DCAE). In this example the policy node 430 is in communication with the controller 418 via a reference point 434 which may be labelled A1. In this example the policy node 430 is hosted at a central cloud, shown schematically at central cloud 436.

Carrier aggregation is a functionality of a radio access network (RAN) in Long-Term-Evolution (LTE) and 5G wireless communication systems, allowing user equipments (UEs) to reach higher throughputs as well as enabling fast-time-scale load-balancing across multiple carriers.

It is well-known that 3GPP has identified multiple stages for a UE to use carrier aggregation—
  a. RAN (e.g., RAN node 402) decides which cells (carriers) should be configured as secondary Cells (Scells) in addition to the primary cell Pcell serving the communication needs of a given UE-typically this is done at the time the UE connects, by using radio resource control (RRC) reconfiguration
    i. When deciding which Scells to configure for a given UE, the RAN takes into account the UE's capabilities for maximum number of supported Scells, load metrics calculated by the RAN and configured priorities of different cells/carriers, etc.
  b. Subsequently, RAN decides when to activate carrier aggregation for a UE, and notifies the UE by sending a medium access control (MAC) control element
    i. At this time the RAN can start scheduling transmissions for the UE on the Scell(s), and the UE will start sending channel quality indicator (CQI) reports for all the configured Scell(s) using physical uplink control channel (PUCCH), etc. RAN can take into account multiple factors, such as the amount of data to send in the buffer, and possibly signal measurements
  c. In each transmission time interval (TTI), as is well-known, a scheduler in the RAN makes decisions for scheduling transmissions and allocating resources for each UE on its Pcell and activated Scells.

Thus the RAN performs various carrier aggregation operations, e.g., decisions, for individual UEs as described above, such as addition or deletion of Scells, activation or deactivation of Scells, scheduling data transmissions and allocating resources. Additionally the RAN may perform other carrier-aggregation-related operations such as changing the Pcell of a UE, handover of a UE, providing measurement configurations to the UE related to its Pcell or configured Scells or cells that may potentially be configured as Scells, etc. The RAN calculates certain metrics and uses certain measurements in making these decisions or operations. In addition, the RAN has several configuration parameters that are typically set statically and may influence the RAN's carrier aggregation operations, such as various thresholds or weights. Namely, the RAN autonomously makes/performs the carrier aggregation decisions or operations for individual UEs, such as adding or deleting Scells for individual UEs, activating or deactivating Scells for individual UEs, and making resource allocation decisions in each transmission time interval for individual UEs.

At least one example embodiment continues to allow the RAN to autonomously perform the carrier aggregation operation to make carrier aggregation (CA) configuration/activation decisions for all individual UEs in any well-known manner, while a controller (e.g., controller 418) provides recommendations on adjustments (e.g., improvements and/or optimization) to the decision logic used by the RAN for these decisions. At least one embodiment enables the controller to provide the adjustments to the RAN's CA decision logic, without incurring the downsides of latency, controller failure, or etc. For example, the RAN's decisions regarding carrier aggregation-related operations for individual UEs would not be impacted by the latency of communication or processing at the controller, and in the event of a controller failure, the RAN can still continue autonomously performing carrier aggregation-related operations for individual UEs. In an embodiment, the RAN node, on receiving recommendations or adjustments from the controller, modifies the way it makes carrier-aggregation decisions for individual UEs. In another embodiment, the controller can receive policy inputs or directives from the policy node that guide the controller's adjustments or recommendations.

Figure 5:
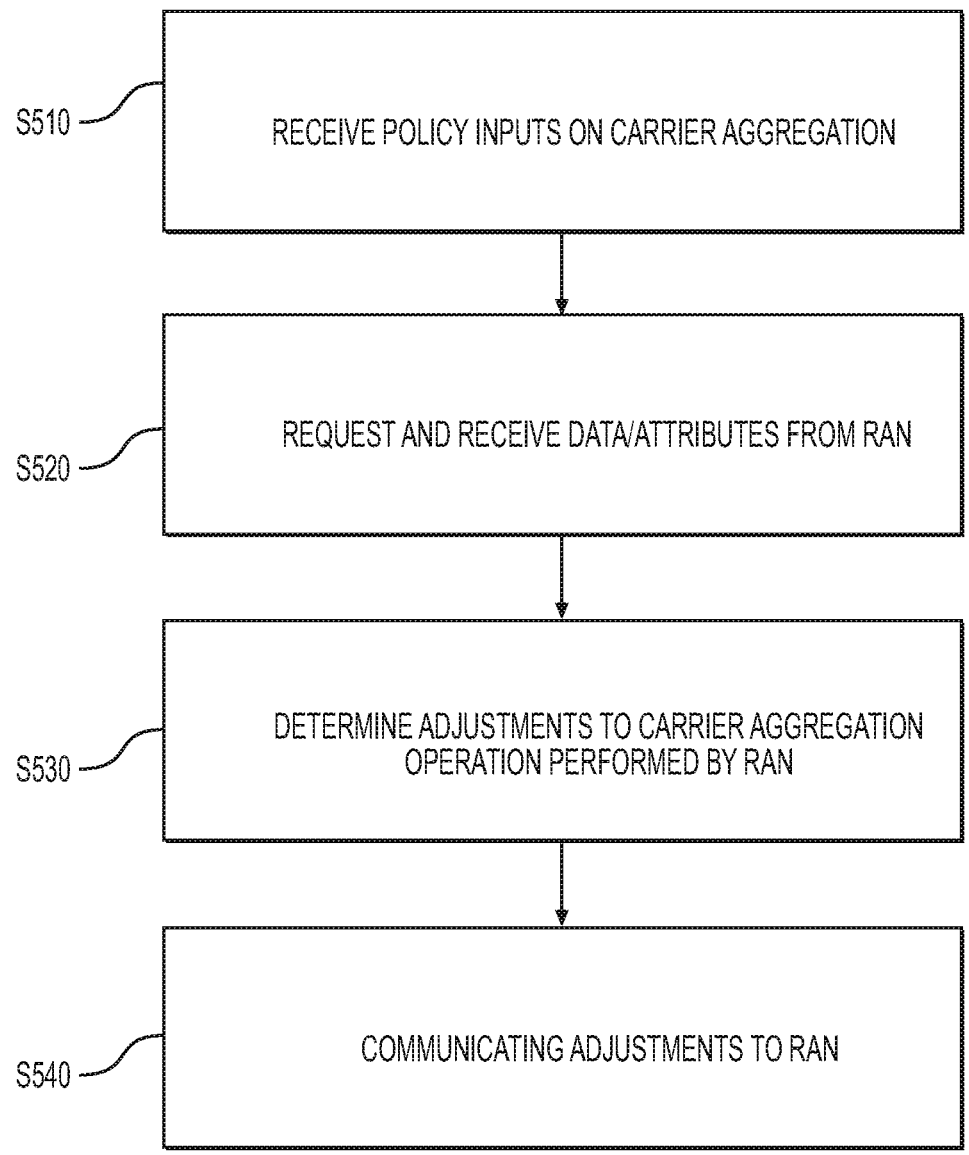
FIG. 5 shows a flow chart of a method according to an example embodiment.

FIG. 5 illustrates a flow chart of operations performed by a controller in adjusting carrier aggregation according to an embodiment. This method will be described as performed by the controller 418, which as previously described is embodied by a control apparatus or apparatuses 300. As such, it will be understood, that the carrier aggregation adjustment operations are performed by one or more processing entities 302 executing computer readable instructions stored by memory 301.

As shown, in operation S510, the controller 418 receives policy inputs from the Policy/Orchestration Engine 430 for carrier aggregation. Communication is over an interface/Reference Point 1 also called A1. As will be discussed in great detail below with respect to FIG. 7, particular elements of the provided policy include: an indication of the desired behavior under high load or low load, an indication of the objective function or utility function or fairness metric that the controller should use to determine its recommendations or adjustments, etc.

In operation S520, the controller 418 requests data/attributes related to carrier aggregation operations performed by the RAN 402, and in response, the controller 418 receives, for example, a set of data/attributes related to carrier aggregation operations performed by the RAN 402. This communication happens over a data exposure API/interface, which is part of Reference Point 2 and called B1. Non-limiting examples of particular data/attributes provided include information or metrics used by the RAN 420 for making a particular Scell addition/deletion decision (load metric component values, priority values, radio channel measurements such as reference signal received power/reference signal received quality (RSRP/RSRQ) or CQI). This will be discussed in more detail below with respect to FIG. 7. Additionally or alternatively, the controller may also receive from the RAN a set of data/attributes that are not directly related to specific carrier aggregation operations performed by the RAN, but aid the controller 418 in its further operations as described below.

In operation S530, the controller 418 determines the adjustment(s) to carrier-aggregation-related operations to be performed by RAN 402. As non-limiting examples, this can include (i) determining biasing factors/offsets/adjustments for load metric calculations or (ii) determining biasing factors/offsets related to the radio channel conditions of a user or within the cell, or (iii) determining whether to increase/decrease the frequency or likelihood with which a certain cell is selected as Scell, or (iv) determining an adjustment to a minimum signal strength or channel condition level in order to select a certain cell as Scell. This will be discussed in more detail below with respect to FIG. 7.

In operation S540, the controller 418 communicates to the RAN 402, or in some embodiments more specifically to a cell in eNB/gNB/RAN, indications of control actions related to the adjustments for carrier aggregation determined by the controller 418. This happens over a control API/interface which is part of Reference Point 2.

Figure 6:
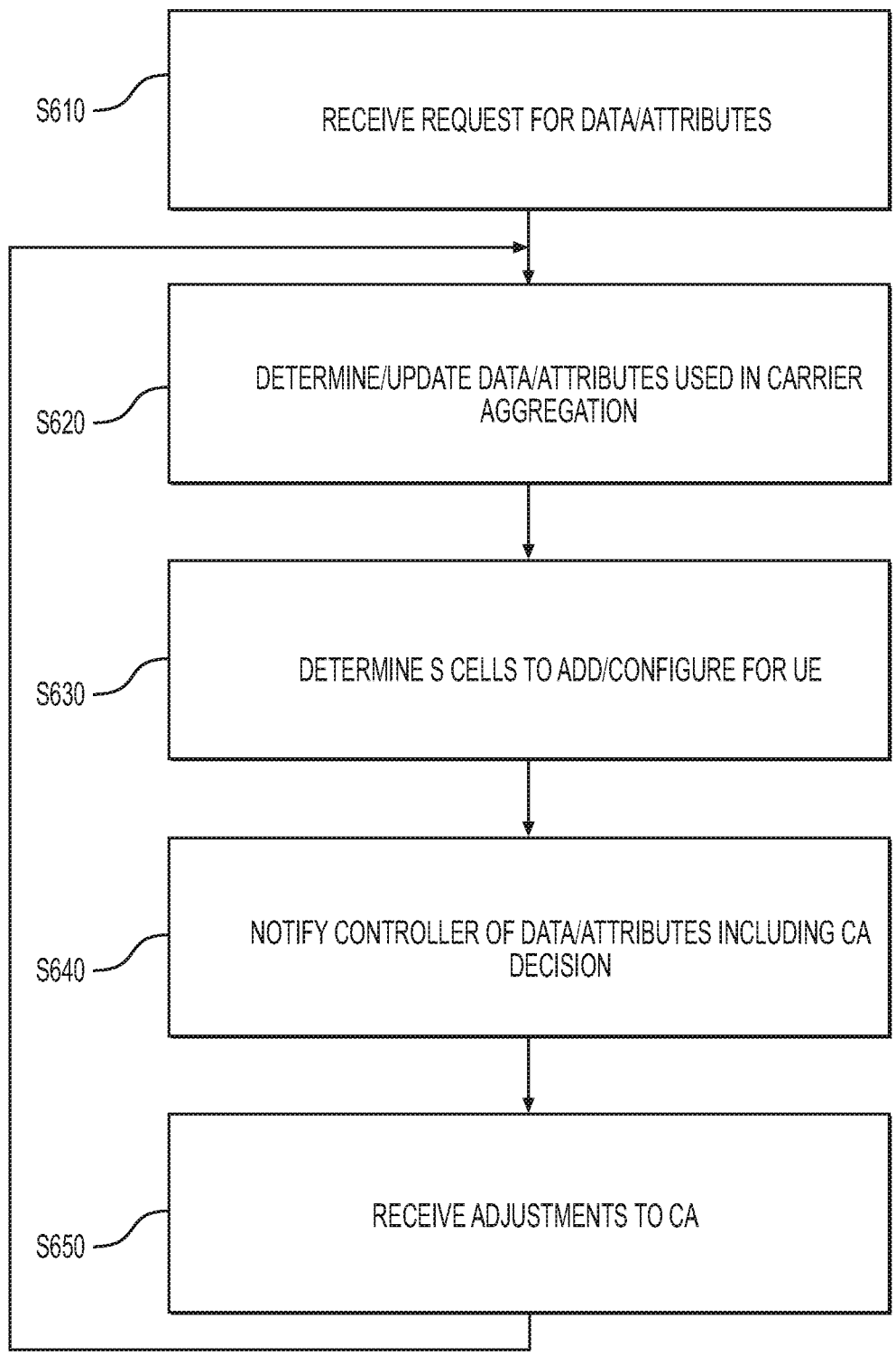
FIG. 6 shows a flowchart of a method according to an example embodiment.

FIG. 6 illustrates a flow chart of operations performed by the RAN 402 in implementing adjustments to carrier aggregation according to an embodiment. This method will be described as performed by the RAN 402, which as previously described is embodied by one or more control entities 300. As such it will be understood, that the described operations are performed by one or more processing entities 302 executing computer readable instructions stored by memory 301. In this embodiment the RAN performs the operation of addition of a Scell of a UE. It should be understood that a substantially similar procedure could be used by the RAN when performing other carrier aggregation operations.

As shown, in operation S610, the RAN 402 receives a request for data/attribute related to carrier aggregation from the controller 418. This communication happens over a data exposure API/interface, which is part of Reference Point 2 and called B1.

The RAN will perform carrier aggregation operations autonomously according to any well-known carrier aggregation methodology. These methods include determining and/or updating data/attributes used in the carrier aggregation methodology, operation S620; and determining Scells to add/configure for a user equipment UE, operation S630. For purposes of discussion only, methods will be described for a single UE for the purposes of clarity and brevity. Non-limiting examples of data/attributes and carrier aggregation methodologies will be discussed in more detail below with respect to FIG. 7.

In operation S640, the RAN 402 will notify the controller 418 of the data/attributes including the Scell addition or deletion in response to the request received from the controller 418. Namely, for purposed of simplicity, the carrier aggregation decisions may be considered data/attributes. It will be understood that more than one notification may occur, and notifications may be event driven, periodic, etc. This will be described in more detail below with respect to FIG. 7. This communication happens over a data exposure API/interface, which is part of Reference Point 2 and called B1.

In operation, S650, the RAN 402 receives indications of control actions and/or the adjustments for carrier aggregation determined by the controller 418. This happens over a control API/interface which is part of Reference Point 2.

Processing then returns to operations S620 where the data/attributes are updated, and S630 where subsequent carrier aggregation operations are performed. However, in implementing the well-known carrier aggregation methodologies, the RAN 402 will adjust parameters or other aspects of the methodology based on the adjustments received from the controller 418 in step S650. This will be described in more detail below with respect to FIG. 7.

Figure 7:
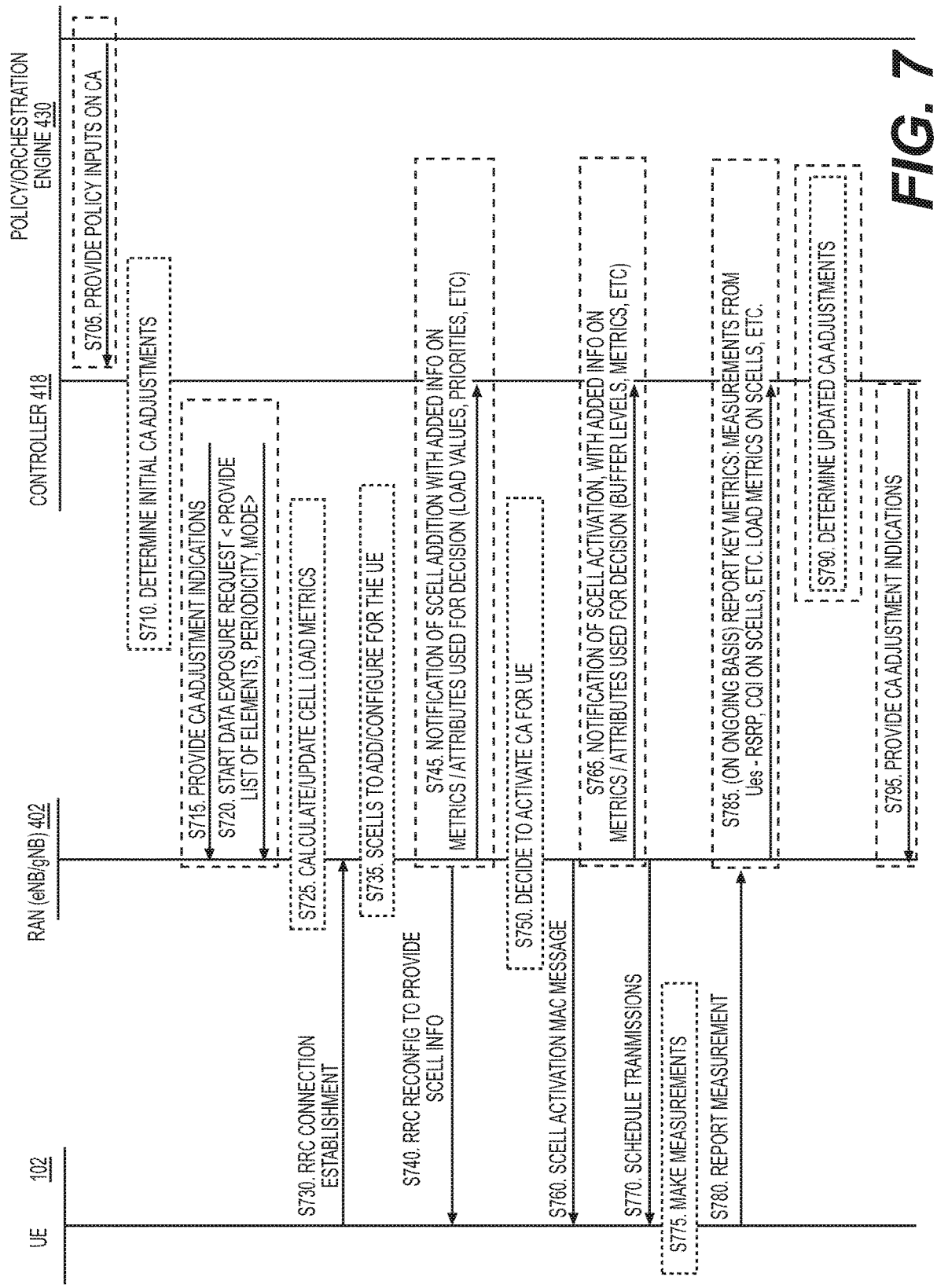
FIG. 7 shows a signaling flow of a method according to an example embodiment.

FIG. 7 illustrates an example message flow with respect to the operation of the controller and RAN discussed above with respect to FIGS. 5-6.

As discussed above, the controller 418 may support an API using which an Orchestration/Policy Engine or OSS 430 can provide Policy inputs to the controller 418 to guide adjusting carrier aggregation. As shown in FIG. 4, this API would be part of A1 interface. This messaging is shown as operation S705 in FIG. 7. These policy inputs may be indicated symbolically or with appropriate encoding. Examples of policy inputs include:

1. Desired Behavior under low load and high load—e.g., "under low load, maximize peak throughput"; "under high load, maximize load-balancing"; etc.

2. Specifying a type of objective function or utility function or measure of load distribution or measure of fairness that the controller 418 should try to achieve across the cells of interest—e.g., "proportional fairness"; "equalize load on all carriers"; "maximize usage of cells on a certain frequency layer"; or "maximize log utility of user throughputs," etc.

As will be discussed in more detail below, the controller 418 uses these policy inputs in its determination of adjustments for the RAN's CA operation. The controller 418 may store initial or default adjustments for the CA operation for each potential policy input or combination of policy inputs. Accordingly, as shown in FIG. 7, the controller 418 in operation S710 accesses the initial adjustments from memory (e.g., memory 301).

As shown, in FIG. 7, the controller 418 sends the RAN 402 indicators of the initial adjustments for carrier aggregation in messaging operation S715, and requests the data/attributes related to determining adjustments for carrier aggregation from the RAN 402 in S720.

The RAN 402 may provide information to the controller 418, for example the set of data/attributes related to facilitating determination of adjustments for carrier aggregation. This would be part of B1 interface in FIG. 4. These data/attributes may relate to carrier aggregation operations performed by the RAN, such as Scell addition, or associated operations such as providing UEs with measurement configurations or the like. The data may be provided at certain events, or periodically on an ongoing basis. The data may be provided by the RAN 402 as soon as available, or in batches. The data may represent attributes of a cell, or attributes of UEs or bearers.

Examples include:

After each Scell addition/deletion or activation/deactivation decision made by the RAN 402, the RAN 402 can provide to the controller 418 the metrics and parameters used in making the decision for a carrier aggregation operation, as well as other related conditions at the time of the operation. For example:

Indication of which carrier aggregation operation was performed, along with an identifier of the UE on which the operation was performed Indications of which Scell was added or deleted for a UE, or additionally including indications of which other cells were considered by the RAN but not selected for Scell addition or deletion Load metric values used to compare different Scells when performing the carrier aggregation operation Priority or Biasing or Offset values (statically configured parameters, or dynamically calculated) that were used for each Scell or for each frequency layer when performing the carrier aggregation operation Radio channel measurements (RSRP, RSRQ or CQI, or etc.)

Individual components of a load metric used to calculate the load metric, such as physical resource block (PRB) utilization, number of PRBs available for Non-guaranteed bit rate (GBR)/GBR, physical downlink control channel (PDCCH) utilization, etc.

QoS weights of different bearers (or the sum of weights of individual UEs' bearers)

Number of connected users on each cell

Indications about whether maximum limits of certain capacity-related attributes of the RAN node were reached that prevented a cell from being considered as an Scell, such as max number of RRC connected UEs, max number of CA users in a cell, or etc. On an ongoing basis, or at suitable events (e.g. Scell addition/deletion/activation/deactivation decision event or the end of a call, etc.), provide information on:

Radio channel conditions (instantaneous or averaged/filtered)—CQI/RSRP/RSRQ

The amount or fraction of a UE's throughput that was delivered over a given Scell Buffer levels of one or more UEs Fraction of UEs getting resources on a given cell that is not their Pcell The operations performed by the RAN 402 to make carrier aggregation decisions and the generation of data/attributes associated therewith are well-known, as is the signaling between the RAN 402 and a UE, for example UE 102, to generate some of the data/attributes. This is shown in FIG. 7 by operations S725-S740, S750-S760, and S770-S780, and the reporting of the data/attributes to the controller 418 is shown by operation S745, S765 and S785. It will be appreciated that this is a non-limiting example, and communication and processing flows will vary depending upon wireless communication standards and protocols employed, including the carrier aggregation methodology employed.

In operation S790, the controller 418 determines adjustments for the RAN to use in the carrier aggregation operation (e.g., making carrier aggregation decisions) based on the received data/attribute and policy inputs. Various examples of different types of adjustments will be described below.

Adjusting Load Calculation of RAN

In this example, the controller 418 determines adjustments to the RAN's load calculation that the RAN 402 should use for making Scell addition decisions. This is particularly advantageous when the RAN is using load on the different candidate Scells as a factor in deciding the selection of Scells to add or configure for UEs.

Based on the policy inputs, the controller 418 may have a target value function that the RAN should try to, for example, optimize across the various cells/carriers (e.g., proportional fairness, or maximizing a log utility function of UE throughputs, or equalizing a load measure across all cells/carriers, etc.).

In making its Scell addition or deletion decisions, the RAN may perform load balancing based on various forms of load metric of the various cells, which may be a combination of measures of the load on various sets of resources, such as a measure of the load on the physical downlink control channel (PDCCH), and a measure of the load on the physical downlink shared channel (PDSCH). The PDSCH load may comprise, for example, of a combination of a fraction or percentage of physical resource blocks (PRBs) used for PDSCH transmissions, or a sum of quality of service (QoS) weights of bearers or the like.

Further, the load metric of a cell may be biased by a per-cell or a per-frequency-layer biasing factor.

Suppose the policy directive from the policy node 430 is that carrier aggregation should achieve proportional fairness (PF) across all cells, or maximize a log utility function of user throughputs. One way to calculate the load metric for an Scell would look like:

$$\text{Ideal PF load measure} = \text{Sum\_over\_Active\_UEs} \text{ (bearer weight*Fraction of throughput (Thput) achieved on that Scell)/(Number of PRBs available for NonGBR)} \quad (1)$$

Further, one way to calculate the load metric of a cell may involve multiplying the above by a factor based on PDCCH load, or per-cell or per-frequency-layer biasing factors.

Thus, in this example, the load metric calculation used by the RAN may not perform as well as an example ideal or desired calculation that would be appropriate for optimizing the target value function indicated by the policy directive from the policy node, and the controller 418 may estimate an adjustment factor to improve or optimize the RAN calculation with respect to the ideal or desired calculation. In some embodiments, one problem could be that the RAN's load metric calculation may be tantamount to assuming that all UEs on an Scell get equal shares of the resources on that carrier. However, in reality, under high load, almost every UE may get a majority fraction of its throughput from one preferred carrier, depending on its spectral efficiency on the different Scells. So, to compensate for this mismatch between the load metric calculation of the RAN and the ideal or desired calculation as per the policy directive or target value function indicated by the policy node, the controller 418 can direct the RAN 402 to send additional data/attributes regarding its carrier-aggregation operation such as resource allocations or data scheduling on Pcells and Scells. This may include, for example, periodically sending data regarding the amount or fraction of throughput achieved on each Scell by CA-activated UEs, along with their bearer QoS weights. The controller 418 can then estimate a mismatch between a "target load" or ideal or desired load metric and the actual load metric calculation being used by the RAN 402 for making its CA addition decisions.

For example, the controller may perform a linear regression between the desired target load metric values and the RAN's calculated or estimated load metric, for example by trying to estimate linear fit parameters A (a multiplicative offset) and B (an additive offset):

$$\text{Target load} = A * \text{RAN\_estimated\_load} + B, \quad (2)$$

where RAN_estimated_load is the load metric reported by the RAN, and "Target Load" is the ideal or desired load metric that the controller 418 determines is appropriate, for example by the calculation based on equation (2). Using multiple observations, the controller 418 estimates improved and/or optimal values of A (multiplicative offset) and B (additive offset) by any well-known statistical regression technique.

In low load, the offsets can be degenerate (e.g. multiplicative offset of 1 and additive offset of 0, or vice versa).

The controller 418 sends indicators of the adjustments (e.g. the multiplicative offset A and additive offset B for load, as above) to the RAN 402. Namely, the RAN adjusts the RAN_estimated_load according to the equation (2) and the adjustment parameters A and B (the adjustments in this example) determined by the controller 418. Accordingly, in operation S710, the controller 418 supplies initial or default values for A and B, and in operation S790, the controller 418 supplies the adjustment parameters A and B based on the above-discussed regression analysis.

Compensate for Systematic Differences in the CQI or SINR Distributions Observed on Different Scells Typically, the RAN decides to add/configure an Scell as soon as the UE connects. However, at that time there is no reliable information available on the particular UE's channel conditions (e.g. Channel quality indication (CQI)) on that Scell. At best, the RAN can check whether a coarse or slower-time-scale measurement like RSRP is high enough, but may be tantamount to assuming that all Scells are identical in terms of the distribution of SINR or CQI that the UE is likely to encounter.

In this example, the controller 418 requests the RAN 402 to report (instantaneous or averaged) channel state information (e.g., channel state or quality indicator (CSI or CQI), precoding matrix indicator (PMI), rate indicator (RI), etc.) of users on each Scell, as well as RSRP/RSRQ.

The controller 418 estimates differences between the Scells, e.g., by estimating an offset between a median or $5^{th}$ percentile spectral efficiency achievable on the Scells. For example, the controller may translate a reported CQI on an Scell (either an individual UE's report, or a snapshot or average across multiple UEs on an Scell) into an equivalent measure of spectral efficiency achievable on that Scell by means of a suitably constructed lookup table. The lookup table may be a design parameter determined through empirical study. From multiple such reports on an Scell, the controller may estimate a measure of overall spectral efficiency on an Scell, such as the median or the $5^{th}$ percentile, or use any of known statistical measures. In one embodiment, this may be performed by any well-known statistical machine learning technique (or neural network technique). The controller translates this offset into a biasing factor that preferentially biases selection of different Scells. For example, the controller may take one of the Scells as a nominal Scell for which the biasing factor is normalized to 1. For any other Scell, the biasing factor could be calculated as a ratio of the median spectral efficiency on that Scell to the median spectral efficiency on the nominal Scell. Thus Scells on which UEs overall tend to achieve relatively higher spectral efficiency may have higher biasing factors, while Scells on which UEs overall tend to achieve relatively lower spectral efficiency may have lower biasing factors. Alternatively or additionally, the controller may determine that a minimum signal strength threshold should be changed, which would impact the Scells and may be allowed for selection for a given UE. For example, for cells in which the UEs tend to achieve a relatively lower CQI or SINR or spectral efficiency, the controller may decide to increase a minimum signal strength threshold. This may have the effect of ensuring that for a cell on which UEs tend to obtain relatively lower CQI or spectral efficiency, the cell gets added as an Scell only for UEs with relatively higher signal strength (greater than the increased minimum signal strength threshold). This may be achieved, for example, by calculating an offset to a minimum signal strength threshold, which can be positive if the threshold is to be increased, and negative if the threshold is to be decreased. In another example, this may be achieved by calculating an offset or biasing factor that is applied to other factors such as the load (rather than directly to the desired metric, in this case the minimum signal strength threshold).

This is not necessarily choosing/biasing the addition/configuration of a particular Scell for a particular UE, but rather for the overall population of UEs.

The controller 418 communicates this offset or biasing factor to the RAN as part of its recommendation or adjustment related to carrier aggregation operations.

For example, the offset may be encoded as a numeric value for each Scell, e.g. a number between 1 and N, where N represents the highest preference and 1 represents the lowest preference.

For any subsequent Scell addition decision for a UE, the RAN 402 uses this offset in its Scell selection decision. For example, the RAN divides its load metric by the offset, and compares the Scells according to this modified load metric, preferentially choosing the Scells with the lowest metrics to add for the UE.

As the user population moves around and the CQI/SINR distribution changes, this will reflect in the CQI reports, which in turn will reflect in the biasing offset when the controller 418 recalculates the offset/biasing factor.

Instead of, or in addition to, communicating specific biasing factors or offsets as described above, the controller may more simply indicate a recommendation or adjustment to the RAN comprising a change (increase or decrease) to the likelihood of selecting a particular Scell in the Scell addition (or deletion) operation. This may be interpreted as a specification of intent by the controller (e.g., an expression of the effect that the controller is trying to achieve). The RAN may then internally adjust its carrier aggregation operation decision logic, for example by internally applying an offset or bias factor depending on its internal implementation. This has the advantage that the controller does not need to know specific internals of the RAN implementation of the carrier aggregation operation.

Determine Adjustments for the RAN's Scell Activation Decision Logic.

In one embodiment, the RAN may base its decision for CA activation of a given UE based on the UE's buffer level, and/or the load level in the Scells. Depending on the thresholds on the buffer level used by the RAN for this activation decision (which could be static or dynamically determined by the RAN), there may be either too few UEs which get CA activated, or too many UEs.

Too few CA-activated UEs would result in lower peak throughputs, or inefficient resource utilization.

Too many CA-activated UEs could result in excessive resource usage without the UEs actually getting significant resources on Scells (e.g. too much channel-condition reporting like CQI reporting resulting in PUCCH resource overload, or too much RSRP reporting on Scells, or other implementation dependent limits being reached).

To compensate for this, the controller 418 may determine improved and/or optimal offsets for the CA activation criteria/levels being used by the RAN. For example, the controller may request the RAN 402 to report to the controller 418 (periodically, or at certain events such as activation/deactivation events) information regarding its CA activation decisions or the underlying criteria, and the effect achieved by CA. Examples include: report buffer levels of UEs, report the fraction of a UE's throughput that was delivered on a given Scell, resource allocations on PUCCH for CA-related reporting (Scell's CQI, etc.), etc.

The controller 418 may estimate an additive (e.g. +/−delta) or multiplicative offset (e.g. (1+x), (1−x), 1/x, etc.) to the criteria (buffer level or load) used by the RAN 402 to activate/deactivate CA. For example, the controller 418 may use reports of PUCCH resource usage to determine that there is resource overload on the PUCCH due to excessive CQI reporting for activated Scells, e.g. by comparing the fraction of resources consumed on PUCCH for Scell CQI reporting to a threshold. The controller 418 may further determine one or more specific Scells which are causing too much CQI reporting, such as by finding the Scells with the highest number of carrier aggregation activated users. Based on this, the controller 418 may determine that the RAN should reduce the likelihood of one or more Scells being selected for activation. The controller 418 may translate this desired reduction in the likelihood of Scells being activated to an offset or biasing factor to apply to the load metric of the Scell or the buffer level of UEs for which those Scells are among the best Scells in terms of channel quality, wherein the offset would be less than 1 so as to indicate the desired reduction in likelihood.

The controller 418 can communicate an indication of the offset back to the RAN 402. The RAN 402 updates the threshold(s) associated with the adjustment factor depending on the type of adjustment factor. For example, the RAN 402 adds additive offsets to the appropriate threshold, or multiplies the appropriate threshold by the multiplicative offset. Alternatively, as mentioned above, the controller 418 may provide this adjustment as simply an indication of an increase or decrease in the likelihood of one or more Scells being chosen for activation, e.g., an expression of intent of the effect that the controller is trying to achieve, and then the RAN may internally adjust its Scell activation calculation to achieve the intended effect, for example by changing its buffer level threshold or biasing its Scell load metric.

In general, the controller 418 can provide to the RAN 402 control actions/indications related to the adjustments for carrier aggregation determined by the controller 418. Non-limiting examples of control actions/indications include:
   a. factors related to relative priorities of different cells in terms of selecting them as Scells
      i. e.g., priorities within a frequency layer, and priorities across frequency layers
      ii. these may be provided as numerical values, or may be indicated as relative changes (e.g. +/−delta increment)
   b. Weights to apply for different components of load metric calculation
      i. e.g., weight for PDCCH load/utilization or PDSCH load (e.g. PRB utilization or Number of active UEs or sum of bearer QoS weights of active UEs) or Number of PRBs available for NonGBR
   c. Offsets or biasing factors (multiplicative or additive or divisive) to be applied to different selection criteria (such as load metric of an Scell) when comparing Scells for the purposes selecting cells for Scell addition/deletion
   d. Offsets or biasing factors (multiplicative or additive or divisive) to be applied to different criteria (such as buffer level or load level) used in deciding Scell activation decisions For each of the above, the priorities/weights/offsets etc. can be indicated as numeric values, or may be indicated as relative change (e.g. +/−Delta).

In the 5G architecture (or in LTE Cloud RAN), where the upper layers of the RAN forms a "CU" (centralized unit—typically deployed in an edge cloud) and the lower layers form a "DU" (distributed unit—typically deployed at the cell site) with the CU and DU interconnected by F 1 interface, the Scell configuration/addition/deletion decisions may be performed in the CU while the Scell activation/deactivation decisions may be made in the DU.

Option 1—the controller may have separate interfaces to the CU and DU, so that it can directly provide the relevant control actions/indications to the CU and DU respectively.

Option 2—The controller may have an interface only to the CU, and communicates all control actions/indications to the CU. The CU in turn may then provide to the DU the relevant actions/indications impacting the operations performed by the DU The controller may also provide, along with a control action, an indication of a particular group or class of UEs to which the control action should be applied, rather than applying it to all UEs in the cell.

Thus, each of the above factors/weights/offsets conveyed may carry an addition indication to indicate that that factor/offset etc. should be applied to UEs belonging to one or more indicated classes, rather than to all UEs in the cell.

One or more embodiments enable operators influence the carrier aggregation operation to improve the performance of any RAN, for example by more accurately reflecting the SINR distribution within the cell, or enabling the operator to improve or maximize a desired objective function, or enabling a more efficient load-balancing or resource utilization, or preventing overload on certain control channels, or the like.

It will be appreciated that a number of the embodiments may be used in combination.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing control entities, clients, gateways, nodes, agents, controllers, computers, cloud based servers, web servers, proxies or proxy servers, application servers, load balancers or load balancing servers, heartbeat monitors, device management servers, or the like. As discussed later, such existing hardware may be processing entities including, inter alia, one or more Central Processing Units (CPUs), system-on-chip (SOC) devices, digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having", as used herein, are defined as comprising (i.e., open language). The term "coupled", as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, control entities, endpoints, clients, gateways, nodes, agents, controllers, computers, cloud-based servers, web servers, application servers, proxies or proxy servers, load balancers or load balancing servers, heartbeat monitors, device management servers, or the like, may be (or include) hardware, firmware, hardware executing software or any combination thereof. Such hardware may include one or more Central Processing Units (CPUs), system-on-chip (SOC) devices, digital signal processors (DSPs), application-specific-integrated-circuits (ASICs), field programmable gate arrays (FPGAs) computers or the like configured as special purpose machines to perform the functions described herein as well as any other well-known functions of these elements. In at least some cases, CPUs, SOCs, DSPs, ASICs and FPGAs may generally be referred to as processing circuits, processors and/or microprocessors.

The control entities, endpoints, clients, gateways, nodes, agents, controllers, computers, cloud-based servers, web servers, application servers, proxies or proxy servers, load balancers or load balancing servers, heartbeat monitors, device management servers, or the like, may also include various interfaces including one or more transmitters/receivers connected to one or more antennas, a computer readable medium, and (optionally) a display device. The one or more interfaces may be configured to transmit/receive (wireline and/or wirelessly) data or control signals via respective data and control planes or interfaces to/from one or more network elements, such as switches, gateways, termination nodes, controllers, servers, clients, and the like.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. An apparatus, comprising:
a memory storing computer readable instructions;
at least one processor configured to execute the computer readable instructions, which configure the processor to,
    receive data/attributes from a radio access network, RAN, related to a carrier aggregation operation performed by the RAN;
    receive a policy input through a policy interface of the apparatus, the policy input indicating a policy objective for the carrier aggregation operation;
    determine at least one policy adjustment of the policy of the RAN that causes the RAN to adjust the carrier aggregation operation based on the received data/attributes and the policy objective; and
    send an indication of the at least one policy adjustment to the RAN, wherein the policy adjustment includes at least one of,
    factors related to a likelihood of selection of different cells during the carrier aggregation,
    relative priorities of different cells for selection during the carrier aggregation, weights to apply for different components of load metric calculation, offsets or biasing factors to be applied to different selection criteria during the carrier aggregation operation, or offsets or biasing factors to be applied to different criteria used in activating selected cells during the carrier aggregation operation.

2. The apparatus of claim 1, wherein the data/attributes include at least one of (1) at least one metric or parameter used by the RAN in the carrier aggregation operation, or (2) a decision resulting from the carrier aggregation operation.

3. The apparatus of claim 2, wherein the metric or parameter used by the RAN in the carrier aggregation operation includes at least one of load metric values used to compare different secondary cells, priority or biasing or offset values for each secondary cell or for each frequency layer, radio channel measurements, physical resource block utilization, number of physical resource blocks available for non-guaranteed bit rate/guaranteed bit rate, physical downlink control channel utilization, quality of service weights of different bearers, a sum of weights of individual user equipment's bearers, number of connected user equipments on each cell, or indications about whether maximum limits of capacity-related attributes were reached that prevented a cell from being considered as an secondary cell.

4. The apparatus of claim 1, wherein the data/attributes include information associate with one or more user equipments, UEs, served by the RAN.

5. The apparatus of claim 4, wherein the information associated with one or more UEs includes at least one of (1) fraction of UEs getting resources on a cell that is not their primary cell serving the UE's communication needs, (2) a measure of the UE's radio channel conditions, (3) fraction of a UE's throughput that was delivered over a secondary cell serving the UE's communication needs, or (4) buffer levels of UEs.

6. The apparatus of claim 1, wherein the factors related to relative priorities of different cells for selection during the carrier aggregation include at least one of priorities within a frequency layer, or priorities across frequency layers;

the offsets or biasing factors to be applied to different selection criteria during the carrier aggregation operation include an offset or biasing factor to be applied to a load metric of a cell; and the offsets or biasing factors to be applied to different criteria used in activating selected cells during the carrier aggregation operation include an offset or biasing factor to be applied to a buffer level of user equipments or cells, or load level of the selected cells.

7. The apparatus of claim 1, wherein the policy adjustment indicates one of a replacement value or a change amount, the change amount being one of an additive change or a multiplicative change.

8. The apparatus of claim 1, wherein the carrier aggregation operation includes at least one of (1) addition or deletion of a secondary cell, (2) activation or deactivation of a secondary cell, or (3) allocation of resources to a user equipment in carrier aggregation on a primary cell or secondary cell.

9. An apparatus, comprising:

a memory storing computer readable instructions;

at least one processor configured to execute the computer readable instructions, which configure the processor to, receive, from a control apparatus, at least one policy adjustment of a policy of a carrier aggregation operation, the policy adjustment being determined by the control apparatus based on a policy objective for the carrier aggregation operation, the policy objective being based on a policy input received through a policy interface of the control apparatus;

update the policy of the apparatus based on the policy adjustment; and perform the carrier aggregation operation based on the policy and the policy adjustment, wherein the policy adjustment includes at least one of, factors related to a likelihood of selection of different cells during the carrier aggregation, relative priorities of different cells for selection during the carrier aggregation, weights to apply for different components of load metric calculation, offsets or biasing factors to be applied to different selection criteria during the carrier aggregation operation, or offsets or biasing factors to be applied to different criteria used in activating selected cells during the carrier aggregation operation.

10. The apparatus of claim 9, wherein the processor is further configured to send data/attributes related to the carrier aggregation operation to the control apparatus, and wherein the policy adjustment received from the control apparatus is further based on the data/attributes.

11. The apparatus of claim 10, wherein the processor is further configured to send the data/attributes based on at least one of an event or periodically.

12. The apparatus of claim 10, wherein the data/attributes include at least one of (1) at least one metric or parameter used by the apparatus in the carrier aggregation operation, or (2) a decision resulting from the carrier aggregation operation.

13. The apparatus of claim 12, wherein the metric or parameter used by the apparatus in the carrier aggregation operation includes at least one of, load metric values used to compare different secondary cells, priority or biasing or offset values for each secondary cell or for each frequency layer, radio channel measurements, physical resource block utilization, number of physical resource blocks available for non-guaranteed bit rate/guaranteed bit rate, physical downlink control channel utilization, quality of service weights of different bearers, a sum of weights of individual user equipment's bearers, number of connected user equipments on each cell, or indications about whether maximum limits of capacity-related attributes were reached that prevented a cell from being considered as a secondary cell.

14. The apparatus of claim 10, wherein the data/attributes include information associate with one or more user equipments, UEs, served by the apparatus.

15. The apparatus of claim 14, wherein the information associated with one or more UEs includes at least one of, (1) fraction of UEs getting resources on a cell that is not their primary cell serving the UE's communication needs, (2) a measure of the UE's radio channel conditions, (3) fraction of a UE's throughput that was delivered over a secondary cell serving the UE's communication needs, or (4) buffer levels of UEs.

16. The apparatus of claim 9, wherein the factors related to relative priorities of different cells for selection during the carrier aggregation include at least one of priorities within a frequency layer, or priorities across frequency layers;

the offsets or biasing factors to be applied to different selection criteria during the carrier aggregation operation include an offset or biasing factor to be applied to a load metric of a cell; and the offsets or biasing factors to be applied to different criteria used in activating selected cells during the carrier aggregation operation include an offset or biasing factor to be applied to a buffer level of user equipments or cells, or load level of the selected cells.

17. The apparatus of claim 9, wherein the policy adjustment indicates one of a replacement value or a change amount, the change amount being one of an additive change or a multiplicative change.

18. The apparatus of claim 9, wherein the carrier aggregation operation includes at least one of, (1) addition or deletion of a secondary cell, (2) activation or deactivation of a secondary cell, or (3) allocation of resources to a user equipment in carrier aggregation on a primary cell or secondary cell.

19. A method, comprising:

receiving, at an apparatus, data/attributes from a radio access network, RAN, related to a carrier aggregation operation performed by the RAN;

receiving a policy input through a policy interface of the apparatus, the policy input indicating a policy objective for the carrier aggregation operation;

determining at least one policy adjustment of the policy of the RAN that causes the RAN to adjust the carrier aggregation operation based on the received data/attributes and the policy objective; and sending the at least one policy adjustment to the RAN, wherein the at least one policy adjustment includes at least one of, factors related to a likelihood of selection of different cells during the carrier aggregation, relative priorities of different cells for selection during the carrier aggregation, weights to apply for different components of load metric calculation, offsets or biasing factors to be applied to different selection criteria during the carrier aggregation operation, or offsets or biasing factors to be applied to different criteria used in activating selected cells during the carrier aggregation operation.

20. A method, comprising:

receiving, at a radio access network apparatus and from a control apparatus, at least one policy adjustment of a policy of a carrier aggregation operation, the policy adjustment being determined by the control apparatus based on a policy objective for the carrier aggregation operation, the policy objective being based on a policy input received through a policy interface of the control apparatus;

updating the policy of the radio access network apparatus based on the policy adjustment; and performing a carrier aggregation operation based on the policy and the policy adjustment, wherein the policy adjustment includes at least one of, factors related to a likelihood of selection of different cells during the carrier aggregation, relative priorities of different cells for selection during the carrier aggregation, weights to apply for different components of load metric calculation, offsets or biasing factors to be applied to different selection criteria during the carrier aggregation operation, or offsets or biasing factors to be applied to different criteria used in activating selected cells during the carrier aggregation operation.

* * * * *